United States Patent [19]

Szymaszek et al.

[11] Patent Number: 4,906,264
[45] Date of Patent: Mar. 6, 1990

[54] OIL SEPARATOR FOR SEPARATING AND COLLECTING OIL ENTRAINED IN REFRIGERANT

[75] Inventors: Paul G. Szymaszek, Waukesha; Robert J. Schintgen, New Berlin, both of Wis.

[73] Assignee: Vilter Manufacturing Corporation, Milwaukee, Wis.

[21] Appl. No.: 406,453

[22] Filed: Sep. 13, 1989

[51] Int. Cl.$^4$ ............................................. B01D 17/038
[52] U.S. Cl. ........................................ 55/324; 55/337; 55/459.4; 210/304
[58] Field of Search ............ 210/787, 788, 304, 512.1; 209/211, 144; 55/46, 55, 97, 159, 204, 205, 183, 184, 259, 337, 323, 324, 459.1, 459.4

[56] References Cited

U.S. PATENT DOCUMENTS 3,955,945  5/1976  Baver ................................. 55/159

Primary Examiner—Frank Sever
Attorney, Agent, or Firm—James E. Nilles; Thomas F. Kirby

[57] ABSTRACT

An oil separator operates to remove oil entrained in a refrigerant being circulated in a refrigeration system, especially a system using a screw-type compressor. The oil separator generally comprises a vessel having a chamber therein and a perforated plate on which oil coalescing elements are mounted divides the chamber into a lower primary oil separator section and an upper secondary oil separator section. A mixture inlet pipe extends through a side of the tank into the lower section for admitting a pressurized mixture of refrigerant and oil. A refrigerant gas outlet port is provided in the upper section for expelling refrigerant from which the oil has been separated. An oil outlet port is provided in the lower section for expelling oil collected in an oil sump at the bottom of the lower section. The inlet mixture pipe defines a passage which comprises a straight horizontal portion and a curved and downwardly sloped portion which terminates in a discharge opening near a curved inner surface of the vessel wall. As the mixture of refrigerant gas with oil entrained therein flows through the passage, oil droplets separate from the refrigerant under centrifugal force along the outer curved wall surface of the passage, exit by gravity and under the force of the gas stream against the curved inner surface of the vessel wall in the lower section and collect in the oil sump for expulsion through the oil outlet port for re-use in the compressor. Oil trapped by the coalescing elements as the gas moves from the lower section to the upper section through the filter elements also returns from the upper section into the oil sump.

15 Claims, 2 Drawing Sheets

OIL SEPARATOR FOR SEPARATING AND COLLECTING OIL ENTRAINED IN REFRIGERANT

BACKGROUND OF THE INVENTION

1. Field of Use

This invention relates generally to an oil separator for separating and collecting oil entrained in a refrigerant circulating through a refrigeration system.

In particular, the invention relates to an oil separator having an improved conduit for injecting a pressurized stream of gaseous refrigerant with oil entrained therein into a lower primary separation section or chamber of the oil separator and for effecting oil separation in the conduit during such injection.

2. Description of the Prior Art

A refrigeration system employs a motor-driven compressor for compressing a gaseous refrigerant which is then supplied in a liquid state to an evaporator wherein the refrigerant re-expands to effect cooling. The refrigerant in a gaseous state is then directed to a condensor from which it is returned to the compressor for recirculation. The compressor, whether it is a piston-type or a screw-type, requires that oil be supplied thereto to effect sealing of clearance spaces between movable compressor components and enable proper compressor operation. Screw-type compressors, which typically employ two intermeshed spiral rotors, require substantially more oil than piston-type compressors. In any case, some of the oil supplied to the compressor becomes entrained in the refrigerant flowing through the system, either in the form of oil vapor or oil droplets or both, and must be removed to ensure proper system operation by means of an oil separator added to the system. The oil so removed is re-used by the compressor. Oil in the system is undesirable because it coats the inner walls of the system piping and reduces heat transfer in critical areas; it accummulates and clogs refrigerant flow paths; and a foamy mixture of refrigerant and oil, especially in screw compressor systems, interferes with the proper refrigerant flow and behavior.

One type of prior art oil separator comprises a vessel having a chamber therein which is divided into a lower primary oil separation section or chamber and an upper secondary oil separation section or chamber by oil coalescing separator means which include a horizontal plate. The plate contains one or more holes therethrough and an oil coalescing separator element is fitted over each hole in the upper section of the chamber. The vessel is provided with a gas outlet port communicating with the upper section and with an oil outlet port communicating with an oil sump in the bottom of the lower section.

Referring to FIGS. 5, 6 and 7 herein labelled "PRIOR ART", gaseous refrigerant with oil entrained therein (hereinafter sometimes called a "mixture") is introduced under pressure through a mixture inlet pipe A which extends through the side wall of the vessel B into the lower primary section. The mixture inlet pipe has a mixture inlet opening C exteriorly of the vessel and a discharge opening D located in the lower primary section adjacent an inner surface of the side wall of the vessel. The mixture inlet pipe has a horizontally disposed S-shaped passage E (FIG. 7) therethrough which acts upon the mixture flowing therethrough so as to separate oil mist and oil droplets H from the gaseous refrigerant under centrifugal force as the mixture negotitates each of the two curves F and G in the passage. The oil mist and droplets H impinge and collect on the outermost passage wall surface of each curve F and G, flow out of discharge opening D onto the inner surface of the side wall of vessel B under the force of gas flow exiting the discharge opening and drain down by gravity into the oil sump. During transit of the mixture through the S-shaped passage E, a substantial proportion of oil is removed from the refrigerant. Residual oil in the refrigerant is subsequently removed by the oil coalescing separator elements as the gaseous refrigerant passes therethrough from the lower primary section into the upper secondary section and then drains or drips down from the holes in the plate into the sump. The gaseous, substantially oil-free refrigerant then exits from the upper section through the gas outlet port is returned to the condenser. Oil is withdrawn from the sump through the lower oil outlet port for re-use in the compressor.

As is apparent from the foregoing description of the prior art oil separator, the mixture of gas and oil enters through mixture inlet pipe A whose passage E has a complex S-shaped curve and effects oil separation by reliance on centrifugal force acting on the oil mist as the mixture changes direction. Upon exiting the curved passage E and entering the lower primary section, the velocity of the gas (with residual oil therein) drops appreciably, and there is a sudden direction change as the gas stream impinges on the inner surface of the side wall of vessel B. The centrifugal action, velocity reduction, and direction change forces more that 90% of the oil to drop out and collect in the oil reservoir. The residual oil, flowing along with the gas, is almost completely removed by the coalescing elements in the upper section of the separator.

It has been discovered that the oil separation efficiency of the prior art oil separator is less than ideal due to the shape and disposition of the mixture inlet pipe A. In particular, some oil separated in S-shaped passage E is re-entrained into the mixture before exiting the passage E. As FIG. 7 shows, some of the oil mist and droplets H that separated at the first curve F in S-shaped passage E and collected on the outer side of the first curve F are flung transversely across the high-velocity gas stream flowing through the passage and re-enter the gas stream and, along with oil still in the stream, again need to be separated at the second curve G in the S-shaped passage E and collected on the outer side of the second curve G. As larger and larger oil droplets form at the first curve F, there is a tendency for some of the oil droplets H to re-entrain while the oil is passing at right angles to the gas. The re-entrained oil, in large droplets, as well as some oil mist not removed at the first curve E, passes on to the outer side of the second curve G where it separates from the gas stream and collects. The fact that not all oil particles H which have re-entered the stream are recovered at the second curve G, results in inefficient oil recovery.

SUMMARY OF THE INVENTION

An oil separator in accordance with the invention operates to more efficiently remove oil entrained in a refrigerant being circulated in a refrigeration system, especially a system using a screw-type compressor wherein much oil enters the refrigerant and creates an excessively foamy mixture. The oil separator generally comprises a vessel having a chamber therein and a plate on which oil filter elements are mounted divides the chamber into a lower primary oil separator section or chamber and an upper secondary oil separtor section or chamber. A mixture inlet pipe in accordance with the invention extends through a side of the tank into the lower section for admitting a pressurized mixture of refrigerant and oil. A refrigerant gas outlet port is provided in the upper section for expelling refrigerant from which the oil has been separated. An oil outlet port is provided in the lower section and communicates with an oil sump at the bottom of the lower section for expelling oil separated from the refrigerant in both the mixture inlet pipe and in the filter elements.

The present invention provides an improved mixture inlet conduit for injecting a pressurized stream of gaseous refrigerant with oil entrained therein into the lower primary separator section of the oil separator and for effecting more efficient oil separation therein during such injection. The inlet mixture pipe defines a passage which comprises a straight horizontal portion and a curved portion in the form of a single J-shaped curve which terminates in a discharge opening near a curved inner surface of the tank wall and slopes slightly downwardly from horizontal. As the mixture of refrigerant gas with oil entrained therein flows through the passage, oil droplets separate from the refrigerant under centrifugal force along the outer curved wall surface of the passage, exit by gravity and under the flow force of the gas stream from the discharge opening of the passage against the curved inner surface of the vessel wall drain down the wall surface and collect in the oil sump for expulsion through oil outlet port for re-use. Residual oil removed from the gas passing from the lower section to the upper section through the coalescing elements collects on the plate and drips therefrom into the sump.

An oil separator in accordance with the invention provides several important advantages over the prior art. For example, the J-shaped curved and downwardly sloped portion of the mixture inlet passage effects separation of most of the entrained oil at a single curved outer wall surface in the passage and causes the oil droplets to collect on that surface from whence they immediately flow, under the force of gravity and in response to fluid flow in the passage, through the discharge end of the passage and onto the side wall of the vessel. The simple, non-complex shape of the curved portion of the passage, as compared to the prior art passage shape, eliminates the possibility of the oil particles, once separated from the stream of gas, from being redirected by any subsequent passage curvature back into the gas stream from which they previously have been separated, as is the case in a prior art oil separator wherein the curvature is complex.

Other objects and advantages will hereinafter appear.

DRAWINGS

Figure 6:
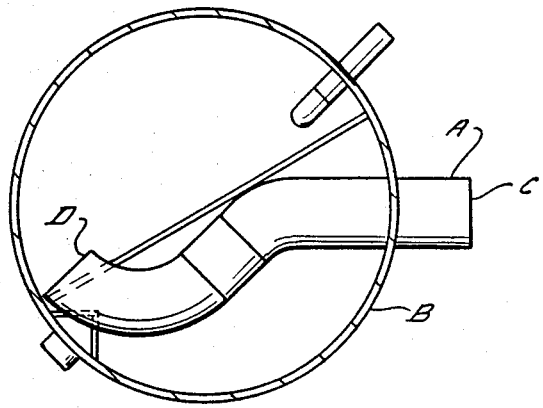
Figure 5:
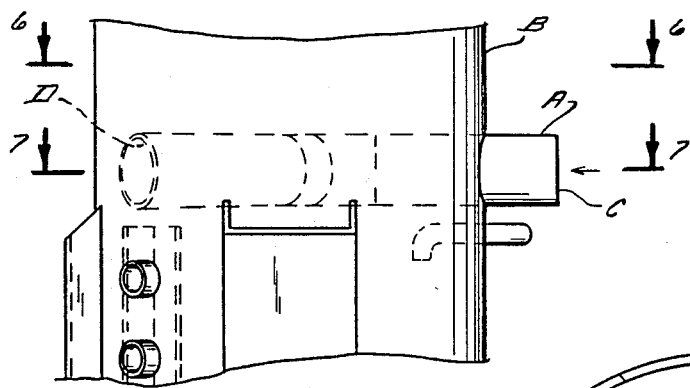
FIG. 5 is a side elevation of a portion of a prior art oil separator showing the mixture inlet pipe therein.
Figure 7:
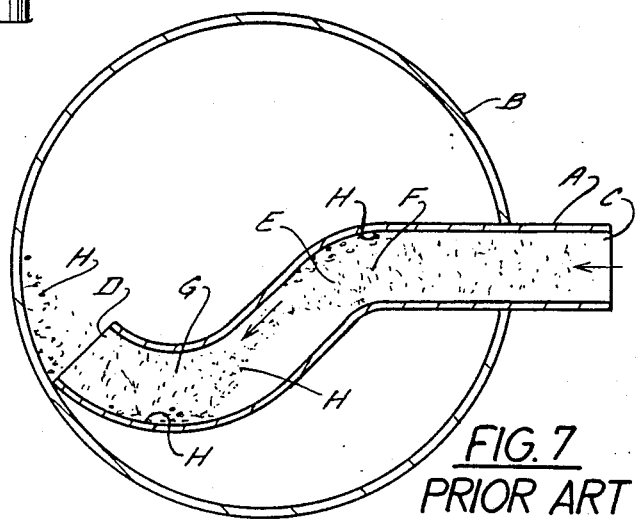

FIG. 6 is a cross-section view taken on line 6—6 of FIG. 5 showing a top plan view of the prior art mixture inlet pipe therein; and FIG. 7 is a cross-section view taken on line 7—7 of FIG. 5 showing the passage in the prior art mixture inlet pipe of FIGS. 5 and 6.

DESCRIPTION OF A PREFERRED EMBODIMENT

Figure 1:
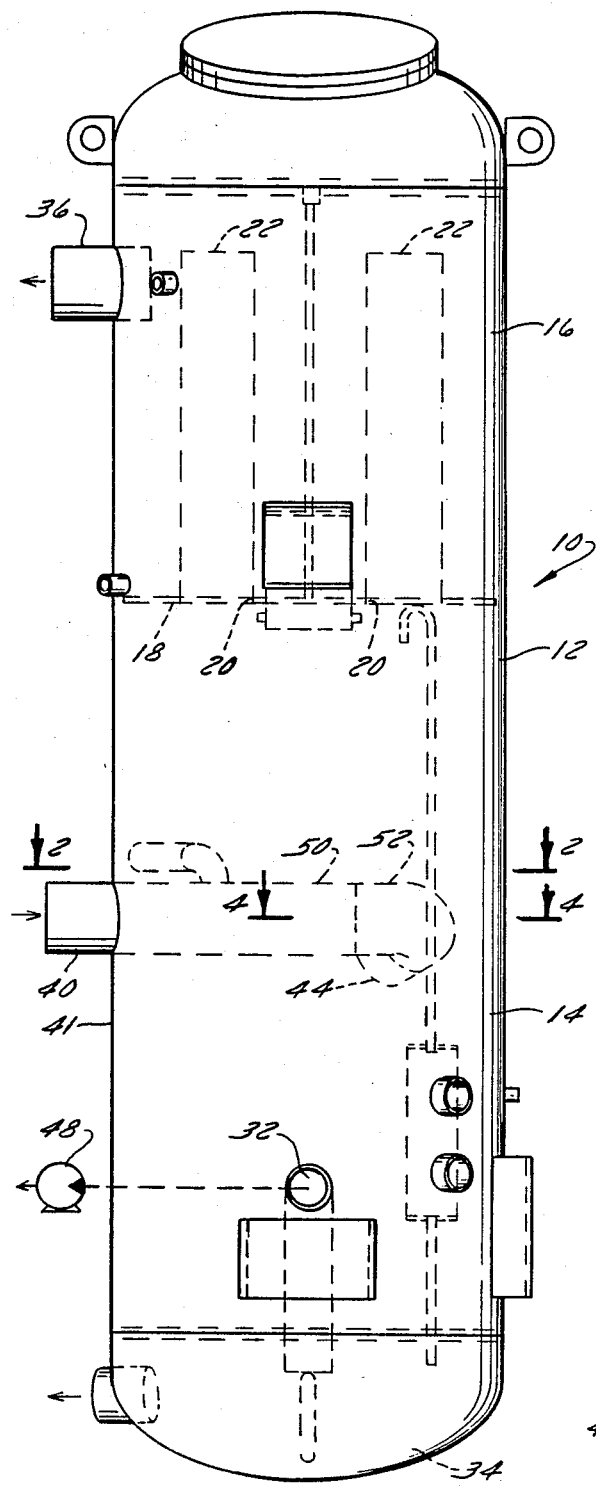
FIG. 1 is a side elevation view of an oil separator in accordance with the present invention and showing filters and a mixture inlet pipe therein.
Figure 2:
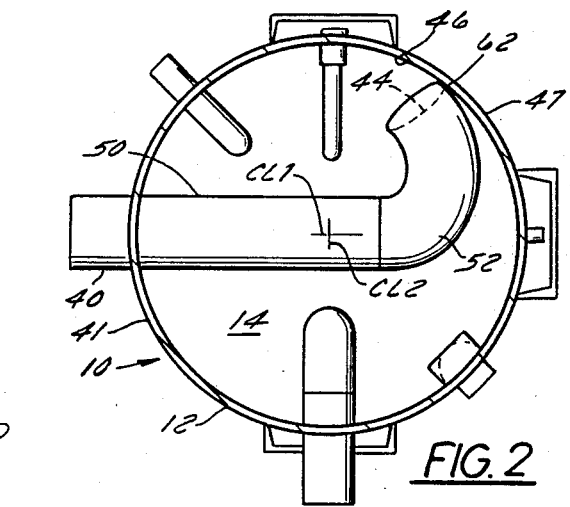
FIG. 2 is a cross-section view taken on line 2—2 of FIG. 1 showing a top plan view of the mixture inlet pipe.
Figure 3:
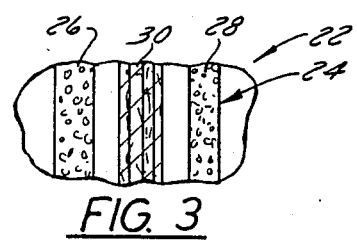
FIG. 3 is an enlarged longitudinal cross-section view of a portion of a side wall of an oil filter element; shown in FIG. 1.
Figure 4:
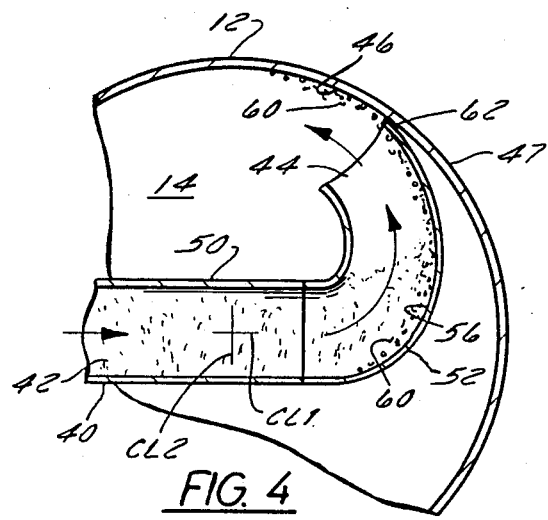
FIG. 4 is a cross-section view taken on line 4—4 of FIG. 1 showing the passage of the mixture inlet pipe of FIGS. 1 and 2.

Referring to FIGS. 1 and 2, an oil separator 10 for separating and collecting oil entrained in a refrigerant circulating through a refrigeration system comprises a vessel 2 having a vertically disposed cylindrical chamber therein and the chamber is divided into a lower primary oil separation section or chamber 14 and an upper secondary oil separation section or chamber 16 by a horizontal plate 18 having holes 20 therein. Oil coalescing separator elements 22 are mounted on plate 18 over the holes 20. Each separator or filter element 2 takes the form of a cylinder open at the bottom and closed at the top and having a side wall 24 which, as FIG. 3 shows, comprises three distinct layers. An innermost layer 26 and an outermost layer 28 are each made of, for example, loose-packed fiberglass and a center (coalescing) layer 30 is made of high-density fiberglass. An oil outlet port 32 communciates with the lower section 14 in vessel 12 to enable removal of oil separated from the refrigerant and collected in a sump 34 at the bottom of lower section 14. A gas outlet port 36 communciates with upper section 16 in vessel 12 to enable removal of gaseous refrigerant collected near the top of the upper section 16 and from which oil has been separated. A mixture inlet conduit 40 extends through a side wall 41 of vessel 12 into lower section 14 and terminates therein. As FIG. 4 shows, conduit 40 has a passage 42 therethrough which terminates at a discharge opening 44. Passage 42 conducts a pressurized stream of gaseous refrigerant with oil entrained therein which supplied from outside of vessel 12 from a refrigeration system (not shown). Passage 42 effects separation of most of the entrained oil from the gaseous refrigerant prior to entry of the gaseous refrigerant, with some residual oil entrained therein, into lower section 14. The oil separated in passage 42 exits therefrom through discharge opening 44 onto an inner wall surface 46 of a side wall 47 of lower section 14 and drains downwardly therealong into sump 34. The gaseous refrigerant, with residual oil entrained therein, flows upward from lower section 14 through the oil coalescing separator elements 22, wherein substantially all residual entrained oil is separated, and the oil drains from the elements 22 onto plate 18 and drips into sump 34. The gaseous refrigerant then flows out gas outlet port and returns to the system. The oil collected in sump 34 is pumped out through oil outlet port 32 by means of a pump 48 (FIG. 1) and is available for re-use in a compressor (not shown).

Referring to FIGS. 1, 2 and 4, in accordance with the present invention, the conduit passage 42 has a straight horizontally disposed portion 50 which is perpendicular to vessel wall 41 through which conduit 40 extends. Conduit passage 42 also has a curved and downwardly sloped portion 52 terminating at discharge opening 44 at the end of passage 42. Discharge opening 44 is disposed above sump 34 and adjacent inner wall surface 46 of side wall 47 in vessel 12, which wall surface is generally opposite, but offset from, the side wall through which conduit 40 extends. The curved portion 52 of passage 42 takes the form of simple J-shaped curve (as distinguished from a complex or S-shaped curve) which proceeds or curves arcuately in one direction in a horizontal plane from straight portion 50. As FIG. 4 shows, curved portion 52 curves through about 135° of arc and terminates at discharge opening 44 at the end of passage 42 immediately adjacent inner wall surface 46. As FIG. 1 shows the discharge end of curved portion 52 also slopes downwardly form horizontal at an angle of about 15°. Preferably, passage 42 has a circular cross-section shape.

As FIG. 4 shows, curved portion 52 of passage 42 is defined by a curved outer wall surface 56 (i.e., on the outside of the turn) against which particles of droplets 60 of oil entrained in the gaseous refrigerant are flung by the action of centrifugal force as the mixture of gaseous refrigerant and entrained oil negotiates the curve in the passage. Oil droplets 60 separated from the refrigerant collect on outer wall surface 56 of curved portion 52 of passage 42, drain downwardly through discharge opening 44 and onto inner wall surface 46 of side wall 47 of vessel 12 under the force of gravity and in response the flow of the gas stream, and drain downwardly on inner wall surface 46 under the force of gravity and collect in sump 34.

As FIGS. 2 and 3 show, in the preferred embodiment cross-sectional configuration which, for purposes of discussion, has a first horizontal centerline CL1 and a second horizontal centerline CL2 perpendicular to the first centerline CL1. Both centerlines CL1 and CL2 lie in the same horizontal plane. Conduit 40 takes the form of a tube or pipe of circular transverse cross-sectional configuration and passage 42 therethrough is also of circular transverse cross-sectional configuration. The longitudinal axis of the straight horizontally disposed portion 50 of passage 42 through which the mixture is first admitted coincides with centerline CL1 and extends inwardly through side wall 41 of vessel 12 to point just past centerline CL2 whereat it joins curved portion 52 of passage 42. As FIG. 1 shows, the longitudinal axis of curved portion 52 of passage 42 at the inlet end of the curved portion coincides with the longitudinal axis of straight portion 50 but gradually curves in one direct (i.e. counterclockwise with reference to FIGS. 2 and 4) through an arc of about 135° and also slopes downwardly from the horizontal plane for an angle of about 15° (see FIG. 1). Furthermore, the discharge end of conduit 40 is cut perpendicularly relative to the terminal end of the longitudinal axis of curved portion 52 of passage 42 so that discharge opening 44 lies in a plane which is transverse to inner wall surface 46 and tilts about 30° downwardly from vertical. That portion of conduit 40 which is contiguous to inner wall surface 46 is tack-welded thereto as at 62 (FIG. 2) to rigidly secure the free end of conduit 40 in place.

The advantages of this construction and arrangement is that oil droplets 60 which collect on surface 56 do not re-enter the gas stream and, in addition to draining downwardly therefrom by gravity due to the 15° slope of curved portion 52 are also propelled through discharge opening 44 by the smooth high-velocity flow of the gas through passage 42. The curvature of curved portion merges more gradually with the curvature of inner wall surface 46 than does the prior art mixture inlet pipe (see FIG. 7) and the planar disposition of discharge opening 44 relative to inner wall surface 46 allows the gas flow through discharge opening to travel nearly parallel to inner wall surface 46 rather than intersecting therewith at greater angle as in the prior art mixture inlet pipe, thereby prevent a needless loss of energy and undue turbulence of gas flow in lower section 14.

Oil droplets 60 collecting an inner wall surface 46 are spun around the inner wall surface of vessel 12 in a downwardly descending spiral path due to the 30° downward slope of curved passage portion 52 and the flow direction of the gas exiting through discharge opening 44 and the pull of gravity on the droplets on inner wall surface 46. As a result, in the course of one rotation around the entire inner wall surface of vessel 12, the droplets do not strike the outer side of mixture inlet conduit 40 and the oil droplets are not deflected or sprayed upward, as in the case of the prior art oil separator, thereby resulting in further oil separation efficiency. Efficiency of the lower portion of separator 14 is judged by the amount of oil collected by the coalescing elements in the upper portion 16 of separator vessel. The coalescing elements have a certain prescribed efficiency of separation and a lower quantity of oil passing from lower portion 14 to the elements improves overall separator performance. The improved oil separator disclosed herein allows 1 gallon of oil to pass through the lower portion 14 in 58 minutes whereas a comparably sized prior art oil separator would allow 1 gallon to pass through the lower portion 14 in 10 minutes.

It it conceivable that discharge opening 44 could be associated with and discharge against a curved plate (not shown) parallel to and spaced from inner wall surface 46, instead of directly against inner wall surface 46 as disclosed herein. However, such an arrangement would not be as efficient as that disclosed because of increased turbulence inside lower section 14.

We claim:

1. An oil separator for separating and collecting oil entrained in a refrigerant circulating through a refrigeration system, said oil separator comprising:

a vessel having a chamber therein with an oil sump at the bottom thereof;

an oil outlet port and a gas outlet port communicating with said chamber near the bottom and top thereof, respectively;

a conduit extending into said chamber and defining a passage having an inlet opening on the exterior of said chamber and a discharge opening communicating with said chamber adjacent an inner wall surface of said chamber;

said passage conducting a pressurized stream of gaseous refrigerant with oil entrained therein and being operable to effect separation of entrained oil from said gaseous refrigerant prior to entry of said gaseous refrigerant into said chamber, wherein the improvement comprises:

means, including a single curved portion in said passage generally orientated in a horizontal plane which curves horizontally in one direction and is bounded by an outer wall, slopes downwardly from horizontal and terminates at said discharge opening, to enable oil mist and droplets to be separated by centrifugal force from said stream as the latter negotiates said curved portion, to collect on said outer wall of said passage, to drain downwardly therefrom under the force of gravity and the force of said stream through said discharge opening onto said inner wall surface of said chamber, and to drain by gravity into said oil sump at the bottom of said chamber.

2. An oil separator according to claim 1 wherein said passage includes a straight horizontal portion near said inlet opening which is disposed perpendicularly to said inner wall surface of said chamber and connects to said curved portion of said passage.

3. An oil separator according to claim 1 or 2 wherein said curved portion of said passage defines a single curve and where it terminates at said discharge opening is substantially tangent to said inner wall surface of said chamber.

4. An oil separator according to claim 3 wherein said inner wall surface of said chamber is curved in the same direction as said curved portion of said passage.

5. An oil separator according to claim 4 wherein said inner wall surface in said chamber is integral with said vessel.

6. An oil separator according to claim 5 wherein said passage has a circular cross-sectional configuration.

7. An oil separator for separating and collecting oil entrained in a refrigerant circulating through a refrigeration system comprising:

a vessel having a chamber therein;

oil coalescing separator means in said vessel dividing said chamber into a lower chamber section and an upper chamber section;

an oil sump at the bottom of said lower chamber section;

an oil outlet port in said vessel communicating with said oil sump in said lower chamber section and enabling removal of oil separated from said refrigerant and collected in said oil sump;

a gas outlet port in said vessel communicating with said upper chamber section and enabling removal of gaseous refrigerant in said upper chamber section after passing through said oil filter means;

and a conduit extending into said lower chamber section and defining a passage having an inlet opening exteriorly of said vessel and a discharge opening communicating with said lower chamber section adjacent an inner wall surface of said lower chamber section for conducting a pressurized stream of gaseous refrigerant with oil entrained therein and being operable to effect separation of entrained oil from said gaseous refrigerant prior to entry of said gaseous refrigerant into said lower chamber section, wherein the improvement comprises means, including a straight portion in said passage and a single curved portion in said passage which is connected to said straight portion, both portions generally orientated in a horizontal plane, said curved portion curving horizontally in one direction in said horizontal plane and being bounded by an outer wall, sloping downwardly from said horizontal plane and terminating at said discharge opening, said discharge opening being disposed above said oil sump and adjacent an inner wall surface of said lower chamber section;

said means enabling oil droplets to be separated from the refrigerant under centrifugal force as said stream transits said curved portion of said passage, to collect on said outer wall of said passage, to drain downwardly under the force of gravity and the force of said stream through said discharge opening onto said inner wall surface of said lower chamber section, and to drain downwardly by gravity into said oil sump;

and said means further enabling refrigerant gas exiting from said discharge opening to pass from said lower chamber section into said upper chamber section through said oil filter means wherein any residual entrained oil is separated therefrom and drained into said sump.

8. An oil separator according to claim 7 wherein said inner wall surface in said chamber is curved in the same direction as said curved portion of said passage.

9. An oil separator according to claim 8 wherein said inner wall surface in said chamber is integral with said vessel.

10. An oil separator according to claim 9 wherein said passage has a circular cross-sectional configuration.

11. An oil separator for separating oil entrained in a gaseous refrigerant comprising:

a vessel having a chamber therein;

and means, including a conduit extending into said chamber and having a passage generally orientated in a horizontal plane and including a curved portion which curves horizontally in one direction in said horizontal plane, is bounded by an outermost wall surface in said passage, slopes downwardly from said horizontal plane and terminates in a discharge opening disposed adjacent a vessel wall surface in said chamber, said means operating to receive and direct the flow of pressurized gaseous refrigerant with oil entrained therein through said passage so that oil droplets separate by centrifugal force in said curved portion of said passage, collect on said outermost wall surface in said passage, and drain therefrom through said discharge opening onto said vessel wall surface under both the force of gravity and the force of the flow of gas entering said chamber.

12. An oil separator according to claim 11 wherein said passage further includes a straight horizontally disposed portion upstream of said curved portion.

13. An oil separator according to claim 11 or 12 wherein said discharge opening lies in a plane which is perpendicular to the terminal end of the axis of said curved portion of said passage and which is nearly transverse to said vessel wall surface.

14. An oil separator according to claim 13 wherein said passage has a circular cross-sectional configuration.

15. An oil separator for separating oil entrained in a gaseous refrigerant comprising:

a vessel having a chamber therein, said chamber having a circular horizontal cross-sectional configuration and bounded by a curved inner wall surface;

and means, including a conduit extending into said chamber through one side of said vessel and having a passage therethrough generally orientated in a horizontal plane and including a straight portion and a curved portion, said straight portion of said passage lying in said horizontal plane and extending through said one side of said vessel and beyond the center of said chamber, said curved portion of said passage curving in one direction in said horizontal plane and sloping downwardly from said horizontal plane and bounded by an outermost wall surface in said passage, said curved portion of said passage terminating in a discharge opening disposed adjacent a portion of said curved inner wall surface of said vessel, said discharge opening lying in a plane which is perpendicular to the terminal end of the axis of said curved portion of said passage and nearly perpendicular to said portion of said curved inner wall surface of said vessel;

said means operating to receive and direct the flow of pressurized gaseous refrigerant with oil entrained therein through said passage so that oil mist and droplets separate by centrifugal force in said curved portion of said passage, collect on said outermost wall surface in said passage, and drain therefrom through said discharge opening into said curved inner wall surface of said vessel under both the force of gravity and the force of the flow of gas entering the chamber.

* * * * *